United States Patent [19]

Nevrekar

[11] Patent Number: 5,342,028
[45] Date of Patent: * Aug. 30, 1994

[54] EXPANDING VALVE ASSEMBLY

[76] Inventor: Venkatesh R. Nevrekar, 6 Castlerock Pl., Shawnee, Okla. 74801

[*] Notice: The portion of the term of this patent subsequent to Apr. 27, 2010 has been disclaimed.

[21] Appl. No.: 26,997

[22] Filed: Mar. 5, 1993

Related U.S. Application Data

[63] Continuation-in-part of Ser. No. 639,917, Jan. 10, 1991, Pat. No. 5,205,535, which is a continuation-in-part of Ser. No. 437,896, Nov. 17, 1989, abandoned.

[51] Int. Cl.$^5$ .............................................. F16K 1/22
[52] U.S. Cl. .................................... 251/163; 251/164
[58] Field of Search ............... 251/163, 164, 196, 199

[56] References Cited

U.S. PATENT DOCUMENTS

| | | | |
|---|---|---|---|
| 556,006 | 3/1896 | Fletcher et al. | 251/199 |
| 880,674 | 3/1908 | Ladd . | |
| 1,512,431 | 10/1924 | Trowe . | |
| 1,995,727 | 3/1935 | Wetherbee | 251/56 |
| 2,383,549 | 8/1945 | Hilker | 251/164 X |
| 3,477,690 | 11/1969 | Murota et al. | 251/163 |
| 3,515,371 | 6/1970 | King et al. | 251/214 |
| 3,823,911 | 7/1974 | Natho et al. | 251/167 |
| 4,179,099 | 12/1979 | Pierce, Jr. | 251/168 |
| 4,188,014 | 2/1980 | Alvarez | 251/196 |
| 4,188,016 | 2/1980 | Whaley | 251/328 |
| 4,189,127 | 2/1980 | Constantino | 251/196 |
| 4,279,404 | 7/1981 | Levin | 251/167 |
| 4,291,862 | 9/1981 | Alvarez et al. | 257/167 |
| 4,334,666 | 6/1982 | Alvarez et al. | 251/167 |
| 4,341,369 | 7/1982 | Meyer | 251/168 |
| 4,405,113 | 9/1983 | Erwin et al. | 251/168 |
| 4,530,488 | 7/1985 | Kemp | 251/167 |
| 4,531,710 | 7/1985 | Tort O. | 251/167 |
| 4,623,119 | 11/1986 | van der Wiel | 251/163 |

FOREIGN PATENT DOCUMENTS

| | | |
|---|---|---|
| 50251 | 5/1935 | Denmark . |
| 259221 | 3/1927 | United Kingdom . |
| 1022571 | 3/1966 | United Kingdom . |

OTHER PUBLICATIONS

Orbit Valve International, Inc.; "Orbit Puts The Lid On Fugitive Emissions."; Circle Reader Response #32.

Primary Examiner—John C. Fox
Attorney, Agent, or Firm—Bill D. McCarthy

[57] ABSTRACT

An expanding valve assembly which includes a closure member supporting at least one segment supported on one side thereof for movement toward a valve seating surface upon movement of the closure member in selective response to valve stem movement. Each segment carries two spaced-apart, parallel wedging-camming surfaces configured to cooperate with complementary spaced-apart, parallel wedging-camming surfaces on the closure member to effect expansion of the segment during closure of the valve. In one embodiment a lift-and-turn mechanism provides selective rotational and axial movement of the closure member during different intervals of movement thereof.

7 Claims, 4 Drawing Sheets

EXPANDING VALVE ASSEMBLY

This application is a continuation-in-part of U.S. application Ser. No. 07/639,917 filed on Jan. 10, 1991, U.S. Pat. No. 5,205,535, entitled "EXPANDING GATE VALVE ASSEMBLY", which is a continuation-in-part of U.S. Pat. application Ser. No. 07/437,896, filed on Nov. 17, 1989, entitled "EXPANDING GATE VALVE ASSEMBLY" (now abandoned), the details of which are incorporated herein by referenced.

BACKGROUND OF THE INVENTION

1. Field of the Invention

The present invention relates generally to valves having an expanding valve assembly, and more particularly but not by way of limitation, to an expanding valve which includes a valve closure member carrying one or more movable segments which move relative to the valve closure member to effect sealed closure of the valve.

2. Brief Description of the Prior Art

Valves with expanding gates have been taught in the prior art, wherein such valves comprise a gate having a female V-surface formed in the upstream side of the gate, a floating segment mounted on the gate, with a complementary male V-surface disposed thereon to engage and coact with the female V-surface on the gate. This gate assembly is usually positioned adjacent seating surfaces within the valve body to move transverse to the conduit axis (direction of fluid flow through the valve). Sealing during opening and closure is effected by the segment being wedged outwardly from the gate perpendicularly to the stem axis to effect sealing engagement with the seat faces. Examples of such valves are taught by U.S. Pat. No. 4,189,127 (Constantino); U.S. Pat. No. 4,530,488 (Kemp); U.S. Pat. No. 4,334,666 (Alvarez et al.); U.S. Pat. No. 4,341,369 (Meyer); U.S. Pat. No. 4,279,404 (Levin); U.S. Pat. No. 4,188,014 (Alvarez); U.S. Pat. No. 3,823,911 (Natho et al.); U.S. Pat. No. 4,188,016 (Whaley); U.S. Pat. No. 4,179,099 (Pierce, Jr.); U.S. Pat. No. 4,531,710 (Tort O.); U.S. Pat. No. 1,995,727 (Wetherbee); U.S. Pat. No. 556,006 (Fletcher); U.S. Pat. No. 1,521,531 (Trowe); U.S. Pat. No. 880,674 (Ladd); U.S. Pat. No. 4,405,113 (Erwin); Danish Patent 50,251 (Lindberg); and United Kingdom Patent 1,022,571.

In expanding valves of the type described, movement of the gate transverse to the conduit axis causes the floating segment to contact a stop structure which arrests further movement of the segment as the gate continues to move. The segment is thereby wedged outwardly so that it sealingly contacts the valve seat. This movement of the segment substantially perpendicularly to the stem axis is effected by the wedging action of the cooperating V-surfaces of the gate and segment.

The wedging action causing expanding movement of the segment occurs in the fully closed or the fully opened position of the valve, and, as indicated, results from predetermined, selectively located fixed segment stops interposed in the path of the segment as it moves with the gate. These segment stops arrest further movement of the segment in a direction parallel to the stem axis. When the gate is moved between the open and the closed positions, the segment is caused to collapse upon, or nest with, the gate as a result to the complementary interfitting V-surfaces.

For smooth and easy operation, and to avoid damage to the valve, it is important that the wedging action of the gate segment occur in only the open and/or closed positions, and that the segment remain in the collapsed condition when the gate is moving between the open and closed positions within the valve body. This prevents unnecessary dragging or binding of the gate assembly against the valve seats at a time when high integrity sealing is not required. Pre-expansion of the segment during travel, referred to as back-wedging, can require excessive torque on the stem to operate the valve, causing the valve assembly to jam, or twist-off and failure of the stem.

The Wetherbee patent (U.S. Pat. No. 1,995,727) is an early expanding valve for low pressure gas mains. A reciprocable gate is provided with a wedge member which coacts with inclined surfaces on the gate. The wedge member is carried by the gate and is caused to engage a shoulder stop to arrest its movement therebeyond, and further movement of the gate effects wedging, expanding movement of the gate assembly into its sealing position.

In the Erwin patent (U.S. Pat. No. 4,405,113), a complex expandable gate valve is disclosed having a first main stem which moves an entire multiple part gate as a unit in reciprocation upwardly and downwardly with respect to the fluid flow passageway, transversely across the valve body. The main stem has a coaxially aligned cam drive shaft having first and second oppositely threaded sections which function to respectively engage the main stem and a central gate block. The central gate block carries a plurality of cam surfaces thereon which are contiguous to each other, and which cooperate with seal blocks which also carry cooperating contiguous cam surfaces that interfit with the cam surfaces on the gate block. The seal blocks are moved outwardly as a result of movement of the central gate block, and the coaxial cam drive shaft is moved by rotation after the entire valve assembly has been positioned across the fluid flow passageway. The cam surfaces formed on the gate block consist of a plurality of contiguous saw-tooth indentations, or triangular steps, in the gate block which cooperate with complementary cam surfaces on the seal blocks. The complicated compound or dual stem structure disclosed in this patent is the mechanism by which the upper central gate block is caused to undergo a reciprocating up-and-down movement within a certain limited range previously established by movement of the main stream to set the gate into position within the valve body.

In the Erwin valve, the outer seal blocks will frequently ride upon, and bear primarily on, only one or at most two of the triangular camming surfaces for the reason that one of the camming surfaces is the highest, and projects out further than the others. This frequently occurs due to the difficulty of machining precisely identical mating saw-tooth surfaces over all of the gate that cooperates equally with all the seal block camming surfaces. The seal blocks consequently will frequently ride on, and bear primarily upon, only a single one of the camming surfaces. It is simply not possible, because of manufacturing tolerances, to predict which of the triangular wedge teeth will protrude out slightly further than the others. Thus, there will be an unpredictable rocking movement of the gate in relation to the seal block due to this very localized support.

The Over patent (U.K. 1,022,571) teaches an expanding valve assembly in which a rotatable valve spindle is connected to a tapered block on which are mounted two ball segments having complementary inclined inner surfaces wedgingly slidable on the tapered block. Each ball segment is forced into the sealing mode by the tapered block as a handle moves the valve spindle.

A spring-loaded detent is fitted to the hub of the handle. This detent cooperates with a vertical groove on the spindle. When the ball segments are free to move, the segments arie rotated by the spindle which in turn is rotated by the handle. Handle rotation is transmitted to the stem by means of the spring-loaded detent engaging the spindle. When the ball segments come to a stop after rotating 90 degrees, the detent becomes disengaged from the spindle groove. Further rotation of the handle reciprocates the spindle via a threaded connection between the handle and the spindle, while keeping the spindle non-rotational.

Resistance must be overcome at the sealing surface on the ball segments to rotate the ball segments. If this resistance at the ball segments is greater than the resistance offered by the detent spring, the spring-loaded detent will become disengaged. Such disengagement is unpredictable and can take place even at very low fluid pressure.

SUMMARY OF THE INVENTION

The present invention provides an expanding valve assembly having a valve body with a fluid flow path therethrough, a valve seating surface being disposed in the valve body along the fluid flow path. A closure member supporting at least one floating segment is disposed to open or to close the fluid flow path, the closure member and floating segment having complementary mating pairs of spaced apart, substantially parallel wedging-camming surfaces.

A travel assembly reciprocatingly moves the closure member/floating segment arrangement in a travel path having interposed therealong a stop member which arrests movement of the floating segment so that continued movement of the closure member effects wedging-camming action between the closure member and the floating segment to expand the closure member/floating segment to seal the valve seating surface.

In one embodiment, the travel assembly has a lift-and-turn assembly which selectively rotates or axially moves the closure member such that opening and closing operations of the valve assembly can be performed with less effort.

An object of the present invention is to provide an expanding valve having one or more segments on a gate wherein the movable segments have improved collapsing ability and less resistance to movement between the valve open and closed positions.

A further object of the present invention is to provide an expanding valve assembly which requires less torque to operate.

Another object of the present invention is to provide an expanding valve assembly which has a long operating life during which fugitive emissions are minimized.

Yet another object of the present invention is to provide a valve operating mechanism which insures high integrity-sealing.

An additional object of the present invention is to provide a bidirectional expanding valve assembly.

Another object of the present invention is to provide an expanding valve assembly of thinner dimension along the fluid flow axis.

One further object of the present invention is to provide an expanding valve assembly which facilitates inline repairs.

Other objects and advantages of the present invention will become apparent as the following detailed description of the invention is read in conjunction with the accompanying drawings and the appended claims.

BRIEF DESCRIPTION OF THE DRAWINGS

FIG. 6 depicts, in side elevational, partial cross sectional view, an expanding butterfly valve assembly constructed in accordance with the present invention having the novel turning mechanism.

DETAILED DESCRIPTION

Figure 1:
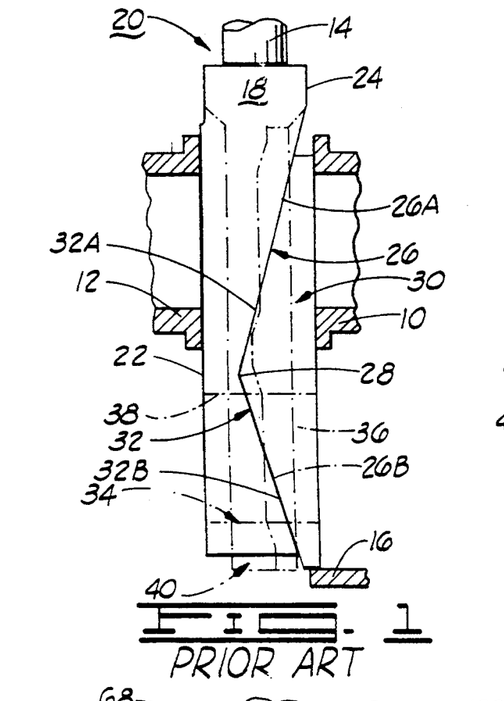
FIG. 1 is a diagrammatic representation of a prior art expanding valve assembly of the type having a gate attached to, and movable by, a stem member, the gate carrying a single upstream movable segment which coacts with the gate via male-female V-shaped contact surfaces on the segment and gate, respectively.
Figure 2:
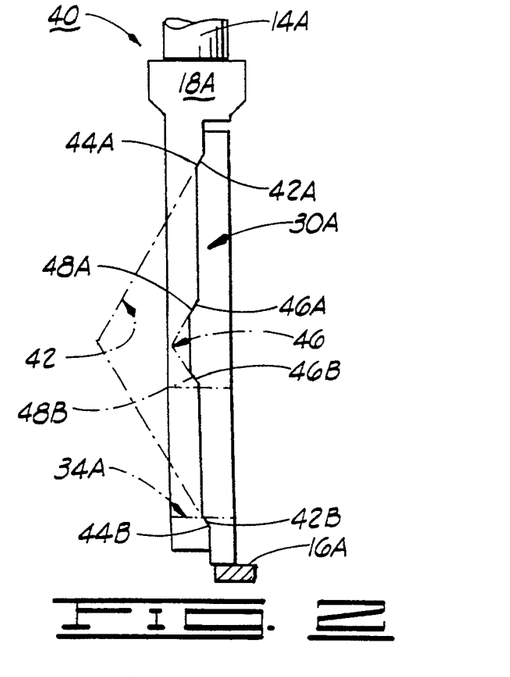
FIG. 2 is a side elevational, diagrammatic view of an expanding gate structure constructed in accordance with the present invention having two, spaced truncated v-shaped contact surfaces.
Figure 3:
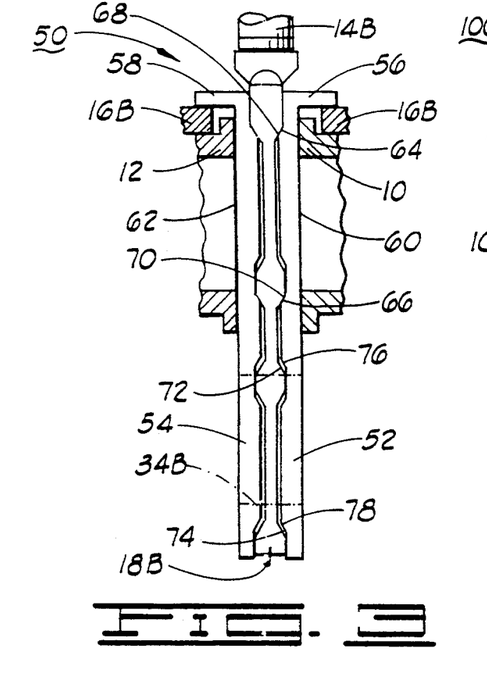
FIG. 3 depicts, in side elevational, diagrammatical view similar to FIG. 2, an expanding gate valve constructed in accordance with the present invention having two movable segments which expand in the valve open position as well as in the valve closed position.

With reference to FIGS. 1-3, the valve seats will generally carry the reference numeral 10 for the upstream seat of the valve, and the reference numeral 12 for the downstream seat of the valve. The valve seats 10, 12 generally extend around the fluid flow passageway through the valve body in an annular configuration, and in the case of the present invention, can be a part of the valve body.

The valve stem will be denominated by reference numeral 14. Stop elements which function to arrest the reciprocating movement of the floating segments are denominated by reference numeral 16. Gate members will be designated by the reference numeral 18.

Another generalization will be extended to the drawings as an aid to understanding how the common inventive principles which characterize the various embodiments are applicable in the case of each of the different embodiments. This is, the first inclined wedging-camming legs of all of the truncated V-surfaces coact in spaced pairs to effect closure of the valve at a time when the floating segments are wedged axially outwardly by such coaction of the upper leg of these V-surfaces in the valve closed position.

Referring to FIG. 1 of the drawings, a prior art expanding gate valve 20 includes the upstream seat 10, the downstream seat 12, the stem 14 and the gate 18 which is secured to the stem 14 for movement therewith in a direction normal to the axis of the fluid flow passageway through the valve 20. The gate 18 has a downstream face 22 and an upstream face 24 which is deeply indented with a full V-surface designated 26. The full V-surface 26 includes a pair of long intersecting legs 26A and 26B. These legs 26A and 26B may be thought of as corresponding to much shorter legs which characterize the upstream face of the gate where truncated V-surfaces forming pairs of wedging-camming surfaces are used in accordance with the present invention.

The legs 26A and 26B intersect at an apex 28 which is sufficiently deeply recessed into the gate 18 with respect to its upstream face 24 that it is necessary to make the gate relatively thick in order to safely withstand the maximum fluid pressure to which it is subjected during the use of the valve 20. The mating V-surfaces are in contact with each other over their entire extent without the necessity for additional bias achieved by the use of springs and levers or the like when the valve is operated, but such devices may be used if required.

A movable segment 30 provided in the prior art expanding gate valve 20 illustrated in FIG. 1 includes a single male V-surface 32 which has an elongated first leg 32A and an elongated second leg 32B. The male V-surface 32 carried on the segment 30 is complementary in configuration to the female V-surface 26 which is formed in the upstream face 24 of the gate 18. A fluid flow bore 34 through the lower portion of the gate 18 and segment 30 is formed by an opening 36 formed through the segment 30 in alignment with an opening 38 in the lower part of the gate 18.

In the status of the prior art valve illustrated in FIG. 1, the movable segment 30 is shown nested in the gate 18 so that the gate 18 is not axially expanded into firm sealing contact with the valve seats 10 and 12.

It will be understood that subsequent to the time when the segment 30 is nested in the gate 18, as illustrated in FIG. 1, and after the stem 14 and gate 18 have moved transversely with respect to the seat 10 (for example, downwardly toward the bottom edge of the drawing), the segment 30 will strike a stop element 16 so that it can no longer move with the gate 18 in a direction transverse to the direction of fluid flow through the valve. The segment 30 will then be caused to undergo an expanding movement as the leg 32A of the male V-surface 32 is wedged outwardly by sliding contact with the cooperating and corresponding V-surface leg 26A of the female V-surface 26 formed in the gate 18.

In order to provide adequate assurance that the monoplanar sealing face of the segment 30 continues to move precisely parallel to the valve seat 10, it is necessary that a relatively large expanse of supporting surface be provided by the area of contact between the leg 32A of the male V-surface 32, and the leg 26A of the female V-surface 26. Otherwise, the segment 30 would tend to become cocked or canted with respect to the gate 18, if there is not enough supporting surface between the segment and the gate. In order to satisfy this requirement for balanced support of the segment 30, it is necessary to make the female V-surface 26 of relatively great depth, and therefore to make the assembly of gate 18 and segment 30 together relatively thick along the fluid flow axis. This increases the overall cost of the gate valve 20 compared to that of the present invention.

In order to facilitate an understanding of the differences which characterize the construction of valves according to the present invention, as compared to the expanding gate valves of the prior art, an expanding gate valve 40, constructed in accordance with the present invention and shown in FIG. 2, is superimposed upon the prior art valve 20 in FIG. 1. The profile of the expanding gate valve 40 is depicted in chain dotted lines in FIG. 1. From this it is clear that the expanding gate valve 40 of the present invention can be made much thinner along the fluid flow axis than the prior art gate valve 20 having but a single, large, female V-surface in the gate, and a corresponding male V-surface on the single segment.

An examination of the gate valve 40 in FIG. 2 shows that a gate 18A, which is connected to a stem 14A includes a first imaginary female V-surface 42 which is truncated so as to provide inclined legs 42A and 42B which are spaced from each other in a direction parallel to the axis of the stem 14A. The legs 42A and 42B extend substantially parallel to, and coact with, correspondingly spaced legs 44A and 44B, respectively, formed on the movable segment 30A. These inclined legs 42A, 42B, 44A, 44B constitute, and are also described as, wedging-camming surfaces.

In order to permit relatively shallow indentations in the gate 18A to form the two pairs of short inclined wedging-camming legs 42A and 42B, a second truncated V-surface having a pair of inclined wedging-camming legs is provided to form the second points of support for balanced and uncanted movement of the segment 30A. A second female truncated V-surface 46 is provided on the face of the gate 18A and has a first wedging-camming leg 46A and a second wedging-camming leg 46B; also a pair of spaced legs 48A and 48B are formed on the movable segment 30A, corresponding to wedging-camming legs 46A and 46B.

It should be noted that, with the gate 18A thus constructed to provide the relatively short inclined wedging-camming legs 42A, 42B, 46A and 46B, the thinnest point of the gate 18A has a dimensional thickness which is substantially equivalent to the thickness of the gate 18 of the prior art expanding gate valve 20 of FIG. 1. Yet the overall thickness of the gate 18A is substantially less than the overall thickness of the prior art gate 18 along the fluid flow axis.

During the operation of the unidirectional expanding gate valve 40 of FIG. 2, the expandable gate assembly moves transversely to the axis of fluid flow through the valve. At a time when the gate 18A together with segment 30A is moved until the segment 30A contacts the stop element 16A in the valve body, the movement of the segment 30A, on contacting the stop 16, is arrested, but the gate 18A can continue to move further. As the gate 18A moves further relative to the segment 30A, the segment 30A is wedged outwardly away from the gate 18A by sliding contact of the male truncated V-surfaces (wedging-camming surfaces) 44A and 48A on the segment 30A with the wedging-camming surfaces 42A and 46A carried on the gate. The segment 30A will, at this time, be forced into firm sealing contact with the upstream seat 10 and the valve will be closed.

When it is desired to open the valve 40, the stem 14A is moved in the opposite direction so that the wedging force on the segment 30A is lessened or relieved and the segment 30A can collapse into the nesting position with the gate 18A depicted in FIG. 2. At the opposite limit of segment travel, an appropriately located stop element (not shown) will arrest movement of the segment 30A with the result that continued movement of the gate 18A will force the segment 30A to expand due to the wedging action brought into effect at the spaced, wedging-camming legs 42B and 46B. It will be noted that these particular legs 42B and 46B of the truncated V-surfaces 42 and 46 are disposed at a location which is immediately adjacent the opposite sides of the fluid flow port or fluid flow bore 34A through the gate 18A. Thus, the expanding movement of the segment 30A away from the gate 18A is accomplished in a balanced, evenly supported fashion, and the segment 30A will not be canted or cocked because it is supported at the two spaced points where the wedging legs 42B and 46B are located. The valve 40 is now in its fully open status.

A bidirectional gate valve assembly 50 is shown in FIG. 3 and has a gate 18B which carries an upstream segment 52 and a downstream segment 54. The gate 18B is connected at its upper end to a suitable stem 14B. The segments 52 and 54 carry stop flanges 56 and 58, respectively, at the upper ends thereof. The stop flanges 56, 58 are disposed to contact stop elements 16B which are connected to, and remain stationary with, the valve body (not shown) during operation.

The upstream valve seat 10 is contacted by an upstream sealing face 60 of the segment 52 during sealing operation, and the downstream seat 12 is positioned to be contacted by a downstream sealing face 62 of the downstream segment 54 during sealing operation. The two segments 52 and 54 are nearly identical, and can therefore be placed either on the upstream side or the downstream side of the gate 18B. The pressure differential of the fluid can act in either direction across the gate 18B, and can be brought to bear on either segment 52 or segment 54, since the segments are of identical design and coact with gate 18B in the same way.

In FIG. 3, the bidirectional gate valve assembly 50 is shown in the closed position as a result of the movement of the gate 18B downwardly (with the page bottom as a reference) and transversely to the direction of the fluid flow until the stop flanges 56 and 58 of the segments 52 and 54, respectively, have contacted the stop elements 16B and cannot continue to move with the gate 18B. At this time, continued movement of the gate 18B downwardly in the valve body causes the segments 52 and 54 to be wedged outwardly towards the seats 10 and 12, respectively. This results from the wedging of wedging-camming legs 64 and 66 carried on the gate 18B and corresponding parallel wedging-camming legs 68, 70 carried on the segment 52. Similar wedging action occurs between the wedging-camming legs carried on the downstream side of the gate 18B against corresponding parallel wedging-camming legs carried on the segment 62.

It will be noted that the wedging-camming leg 64 is relatively widely spaced from the wedging-camming leg 66 along a line which extends parallel to the axis of the stem 14B. Also, it will be noted that the cooperating legs 64 and 66 at the upper end of the gate 18B and the legs 68 and 70 are spaced so that the force wedging the segment 52 axially to effect the closure of the valve is preferably distributed uniformly opposite the seat surfaces against which the segment 52 is forced in sealing engagement.

When the bidirectional gate valve assembly 50 of FIG. 3 is to be opened, the stem 14B is moved upwardly, causing the gate 18B to retract. As soon as this movement commences, the segments 52 and 54 can collapse to nest in the recesses defined between the wedging-camming legs formed on the gate 18B. This reduces the frictional drag exerted by the segments 52 and 54 against the seating surfaces of the seats 10 and 12 of the valve 50, permitting gate-segment movement from the closed to the open position to proceed smoothly without excessive torque.

When the bidirectional gate valve assembly 50 is opened, fluid flow passageway 34B through the segments 52, 54 and the gate 18B is raised into alignment with the fluid flow passageway through the valve body and through the two opposed seating surfaces of the seats 10 and 12. At this time, in order to seal the valve 50 in the open position where such is desired, a pair of second stop elements (not shown and which can be located above the stop elements 16B) arrest further upward movement of the stop flanges 56 and 58 which contact the second stops.

Continued upward movement of the gate 18B causes it to move to the point where wedging-camming legs 72, 74 on the lower part of the segment 52 contact, and wedge outwardly, parallel wedging-camming legs 76, 78 on the gate 18B. Similar wedging action occurs on the downstream segment 54. The spacing of the parallel, spaced wedging-camming legs or surfaces has been previously discussed and is applicable to these legs. These wedging actions again force the segments 52, 54 into sealing contact with the seating surfaces of the upstream seat 10 and downstream seat 12, respectively, when the valve 50 is in the open position.

Some kind of arrangement (not shown), such as the incorporation of a sleeve or the like, can be added to seal the fluid flow bore 34B from the valve body cavity in the valve open position.

FIG. 4

Figure 4:
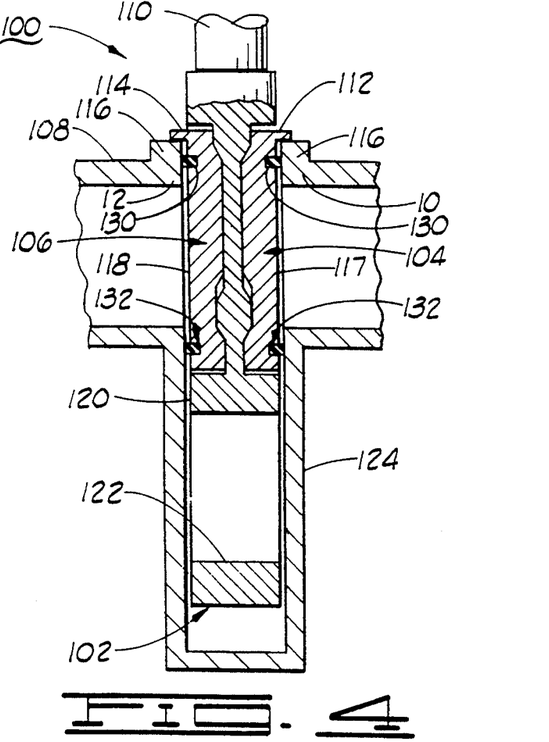
FIG. 4 depicts an expanding gate valve which incorporates two segments which expand to seal the valve in the closed position and a full conduit bore in the valve open position.

An expanding valve assembly 100 shown in FIG. 4 incorporates useful features of the present invention. The expanding valve assembly 100 has a gate 102 which carries a movable upstream segment 104 and a movable downstream segment 106 on opposite sides thereof in a valve body 108. The expanding valve assembly 100 is bidirectional as the upstream and downstream segments 104 and 106 are substantially identical in construction detail and can be placed either on the upstream side or the downstream side of the gate 102. A stem 110 is connected to the upper end of the gate 102.

The segments 104 and 106 carry stop flanges 112 and 114, respectively, at the upper ends thereof. The stop flanges 112, 114 are disposed to contact stop elements 116 which are connected to, and remain stationary with the valve body 108. The upstream valve seat 10 is contacted by an upstream sealing face 117 of the segment 104 during sealing operation, and the downstream valve seat 12 is contacted by a downstream sealing face 118 of the segment 106 during sealing operation. As mentioned for the bidirectional valve assembly 50 of FIG. 3, the expanding valve assembly 100 can accept pressure differential in either direction across the gate 102.

The expanding valve 100 is depicted in the closed position in FIG. 4 as a result of the movement of the gate 102 downwardly and transversely to the fluid flow direction until the stop flanges 112 and 114 of the segments 104 and 106, respectively, have contacted the stop elements 116. At this time, further movement downwardly causes the segments 104 and 106 to be wedged outwardly towards the seats 10 and 12, respectively, to seal the valve in the closed position via the pairs of wedging-camming legs carried by the gate 102 and segments 104, 106.

The gate 102 of the expanding valve assembly 100 has a lower conduit portion 120 through which the flow conduit 122 extends. The valve body 108 has a lower cavity portion 124 into which the lower conduit portion 120 extends when the expanding valve assembly 100 is closed. In the open position of the expanding valve assembly 100, the lower conduit portion 120 is raised to align the flow conduit 122 with the flow passageway of the expanding valve assembly 100.

Each of the upstream sealing faces 117 and 118 preferably carry a sealing ring 130 disposed in an annular sealing ring groove 132. The sealing rings 130 engage the sealing surfaces of the upstream and downstream valve seats 10, 12 when the segments 104, 106 are expanded axially outward from the gate 102 when the expanding valve assembly 100 is closed.

The advantages of the present invention become clearly apparent with reference to the expanding valve assembly 100 of FIG. 4. The location of the wedging-camming surfaces interacting between the gate 102 and the wedge segments 104, 106 provides uniform force or pressure transferred from the stem 110 to the sealing faces of the valve seats 10, 12 to give bubble tight sealing. Also, the wedge angles are so chosen as to provide excellent collapsing ability to the segments to nest with the gate, essentially minimizing drag on the sealing surfaces of the valve seats 10, 12 when opening the valve.

FIG. 5

Figure 5:
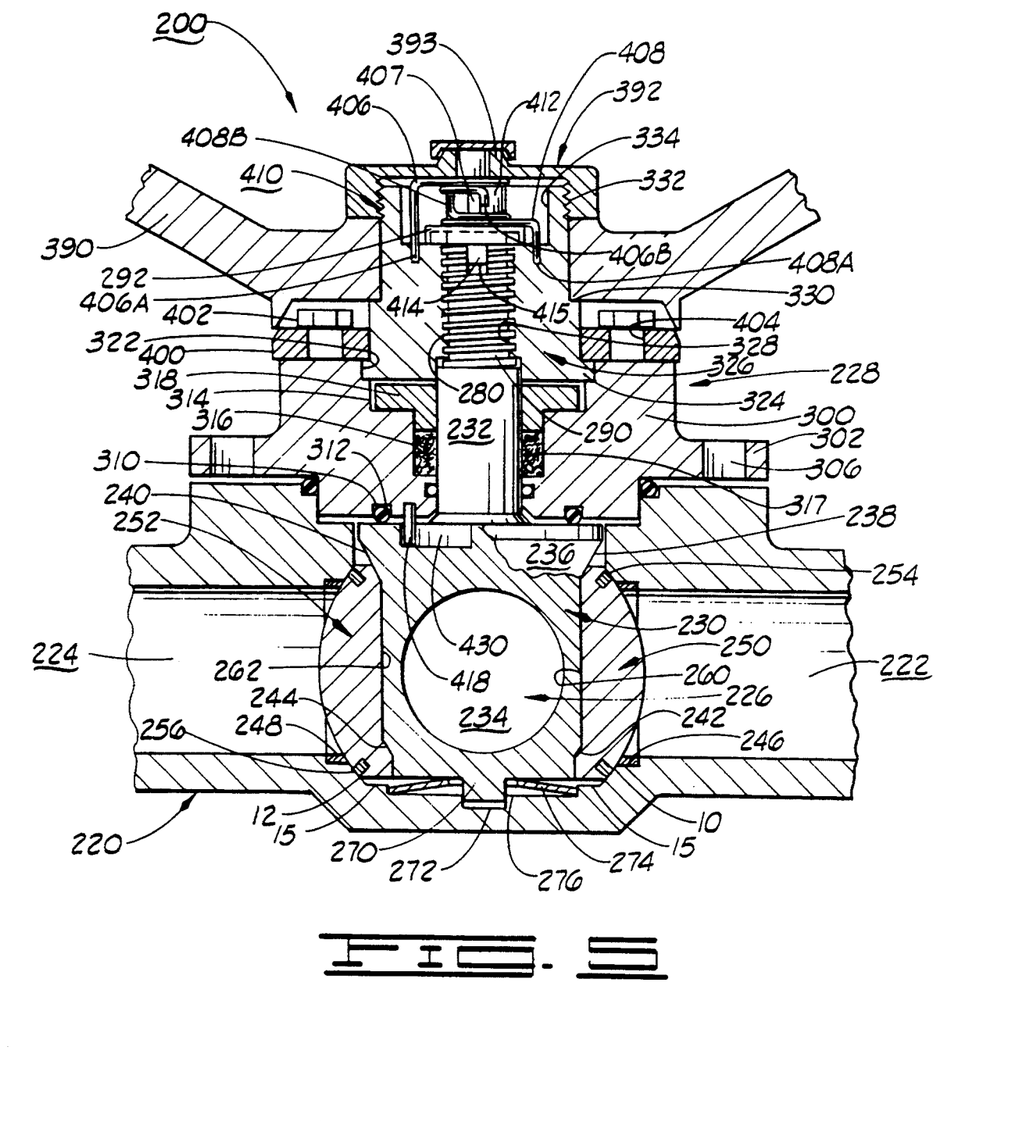
FIG. 5 depicts, in side elevational, partial cross-sectioned view, a bidirectional expanding valve assembly constructed in accordance with the present invention in which a gate carries a movable segment on each of its opposing sides, so that fluid pressure can act in either direction on either of the two segments, and the gate will function to seal in either direction. A novel turning mechanism is provided to move the gate/segment assembly.

FIG. 5 shows yet another expanding valve assembly 200 which is constructed in accordance with further features of the present invention.

A valve body 220 includes an upstream fluid flow passageway 222 and a downstream fluid flow passageway 224, and the valve body 220 defines a central cavity denominated generally by reference numeral 226. The central cavity 226 is open to the fluid flow passageways 222 and 224, and also opens upwardly through one side of the valve body 220 to communicate with the interior of a bonnet 228. The valve body 220 carries the annular upstream seat 10 and the annular downstream seat 12 as hereinabove described.

Within the valve body 220 and cavity 226, a rotary gate structure 230, connected to a stem 232, has a bore 234 formed transversely therethrough which registers with the fluid flow passageways 222 and 224 when the valve 200 is open. The gate 230 includes an upper portion 236 which incorporates inclined, wedging-camming surfaces 238 and 240 located at opposite sides of the gate 230 on the upstream side facing the upstream seat 10 and on the downstream side facing the downstream seat 12, respectively.

At the lower portion of the gate 230 is provided a pair of inclined wedging-camming surfaces 242 and 244 that extend substantially parallel to the wedging-camming surfaces 238 and 240, respectively, disposed at the upper portion of the gate 230. It will be noted that the pair of parallel wedging-camming surfaces 238 and 242 are relatively widely spaced from each other so as to be located relatively close to the annular upstream seat 10 and the annular downstream seat 12, which seats extend around the fluid flow passageway 222 and 224 where these fluid passageways enter the central cavity 226 of the valve body 220. And, as for all of the embodiments, the wedging-camming surfaces 238, 242 and 240, 244 form pairs of wedge surfaces which are not coplanar; that is, each such pair comprises wedging-camming surfaces which are substantially parallel spaced apart wedge surfaces.

The upstream seat 10 within the valve body 220 carries an annular sealing element 246 of a material suitable for effecting a seal at this location. Also, the downstream seat 12, in addition to the metal surface provided there for metal-to-metal sealing, has an annular sealing element 248 which is retained in an annular recess or groove.

On opposite sides of the gate 230 facing the upstream seat 10 and the downstream seat 12, respectively, a pair of floating segments 250 and 252 are disposed. As illustrated, each of the segments 250 and 252 is frustospherical in configuration; that is, each portion of a sphere is formed when a plane is passed through one side of a sphere offset from and parallel to, a diametric plane through the sphere. The outer peripheral surfaces each of the floating segments 250 and 252 are formed as spherical segments or frustospherical surfaces, and at appropriate locations therealong, these mate with complementary curved surfaces of the upstream and downstream seats 10 and 12, respectively. At this location, the upstream segment 250 carries a radially outwardly projecting sealing ring 254. This optional sealing ring 254 is positioned to bear against a portion of the upstream seat 10 as shown in FIG. 5. In similar fashion, an optional annular sealing element 256 is located at an appropriate sealing location on the downstream floating segment 252.

For the purpose of this invention, the shape of the floating segments 250 and 252 can be any selected shape of solid of revolution so long as complementary shape is provided to the upstream and downstream seats 10 and 12.

The floating segments 250 and 252 have gate-contacting sides which include central surfaces 260, 262 which face the sides of the central portion of the gate body 232 of the gate 230.

The segments 250 and 252 will rotate with the gate 230 about an axis extending transverse to the axis of the fluid flow passageways 222 and 224 and parallel to, or coincident with, the axis of the valve stem 232 as hereinafter described. Thus, the gate/floating segment arrangement shown in FIG. 5 is constructed for rotation about a central axis so that the cylindrical bore 234 through the gate 230 can be brought into alignment with the fluid flow passageways 222 and 224. This rotation moves the floating segments 250 and 252 to a position in which they are located 90° from that shown in FIG. 5. The segments 250 and 252 are free to move reciprocably, however slightly, relative to the gate 230 in a direction parallel to the axis of the valve stem 232 and transverse to the direction of fluid flow through the valve.

As shown in FIG. 5 the gate 230 has a trunnion 270 which projects from the center of the bottom of the gate 230 into a small receiving cavity or recess 272 of complementary configuration thereto and formed in the valve body 220. The gate 230 is resiliently biased upwardly by a suitable spring element 274 positioned in a receiving recess 276 formed in the valve body 220.

The lower portion of the stem 232 is secured to the top of the gate 230 at a central location thereof, and the stem 232 has an external helical thread 280 at its upper end portion. A dish-shaped top cap 292 is mounted in the valve body 220 over the threaded upper end portion of the stem 232 and is upset to permit the upper threaded end portion of the stem 232 to move upwardly into the top cap 292 by a small amount during the operation of the valve 200 as hereinafter described.

The bonnet 228 of the valve 200 includes a central body 300 having an outwardly extending flange 302 which has a plurality of apertures through which bolts (not shown) are extended to connect the bonnet 228 to the valve body 220 via appropriately disposed threaded holes (not shown) in the valve body 220. The inner side of the bonnet 228 which extends over the opening into the central cavity 226 has an annular recess 310 therein to accommodate a suitable O-ring seal 312. The O-ring seal 312 bears against the upper side of the gate 230 as shown in FIG. 5.

The bonnet 228 also has a central opening therethrough for the accommodation of the stem 232, and is provided with a pair of counterbores 314 and 316 of differing diametric dimension. The smaller diameter counterbore 316 supports a chevron packing 317 which seals about the outer periphery of the stem 232. A packing gland 318 fits around the stem 232 and has an outer flange portion which is disposed in the counterbore 314. The packing gland 318 functions to retain the packing 317 relative to the bonnet 228 and the stem 232. The packing gland 318 can also be live loaded (not shown). The O-ring seal 312 isolates the chevron packing 317 from fluid pressure in the valve open position and thus prolongs its life and also drastically reduces fugitive emissions. Besides, the live loading on the stem packing, as is the custom today, may not be needed to prevent fugitive emissions.

The bonnet 228 further includes, at its upper side, an upwardly opening annular cavity or recess 322 which communicates with the counterbore 314 and opens at the upper side of the bonnet 228. The recess 322 receives an annular flange 324 carried at one end of a large nut 326 which has a central bore therethrough which has an internal thread dimensioned to mate with, and threadedly engage, the threaded upper end portion 280 of the stem 232. Around its outer periphery, the nut 326 has an annular shoulder 330 intermediate its length. At its upper end, a relatively short external helical thread 332 is provided. Between the thread 332 and the shoulder 330, the nut 326 is of hexagonal or any other cross-sectional configuration, by which the handle 390 and the nut 326 rotate together.

The upper end portion of the nut 326 has a large bore 334 formed centrally therein which communicates with the threaded passageway 328 to enable the nut 326 to be threadedly engaged with the threaded upper end portion 290 of the stem 232. The hexagonal cross-sectional configuration is keyed to an operator handle 390.

A unique, novel turning means is mounted on the threaded upper end portion 290 of the stem 232 as is described hereinafter. A closure cap 392 threadedly engages the external thread 332 of the nut 326, and extends across and closes the bore 334 formed centrally in the upper side of the nut 326. The closure cap 392 is screwed down on the external threads 332 on the nut 326. The closure cap 392 includes a central hub 393 which surrounds the upper stem segment 412 of the stem 232. The upper stem segment 412 rests upon the cap 292 and carries a key 414 which projects into a recess of complementary cross-sectional shape 415 formed in the upper end of the stem 232. Rotation of the stem segment 412 will thus cause rotation of the stem 232 and the gate 230. The recess 415 is of greater depth than the length of the key 414 so that the principal part of the stem 232 can move upwardly a short distance.

The nut 326 is retained in position by an annular plate 400 which extends around its outer side; the annular plate 400 is bolted to the bonnet 228 by bolts 402 extended through holes 404. The annular plate 400 fits over the flange 324 formed on the lower end of the nut 326 and retains the nut 326 as shown.

A pair of oppositely acting torsion springs 406 and 408 are disposed in the bore 334 in the nut 326 and form a part of a lift-and-turn mechanism 410 which is employed in the valve 200. The top torsion spring 406 has an end of a leg portion 406A extended into a receiving recess in the nut 326, and is then bent through 90° and curved through one or more convolutions which encircle the upper stem segment 412 of the stem 232. The top torsion spring 406 is then again bent through 90° and ends in a leg portion 406B. A lug 407 which is carried on the upper stem segment 412 of the stem 232 projects into the path of rotation of the leg portion 406B of the spring 406 when the spring 406 is rotated by the handle 390.

The second or bottom torsion spring 408 has a leg 408A extended into a recess formed in the bottom or base of the bore 334 in the nut 326. The leg 408A is located about 180° around the circumference of the bore 334 from the recess into which the leg 406A of the top torsion spring 406 is extended. The bottom torsion spring 408 is curved through one or more convolutions which encircle the upper stem segment 412 of the stem 232, and ends in a leg portion 408B after being bent through an angle of 90°. The lug 407 also projects into the path of movement of the leg portion 408B when the bottom torsion spring 408 is rotated relative to the upper stem segment 412 of the stem 232.

The valve assembly 200 in FIG. 5 is shown in its closed position. To open the valve assembly 200, the handle 390 is rotated counterclockwise (looking from the top), and the nut 326 to which it is keyed also undergoes rotation. This movement causes the top torsion spring 406, including both the leg 406A and the leg portion 406B, to also rotate. This moves the leg portion 406B away from the lug 407 as shown in FIG. 5. In other words, the nut 326 at this time rotates relative to the threaded portion 280 of the stem 232, and the relative movement is such that the stem 232 and the gate 230 carried thereon are threaded upwardly relative to the valve body 220, and can best be described as a limited, free-travel interval of the turning means. This limited free-travel interval of the turning means can be adjusted, for example, by changing the distance between the leg portions of the torsion springs and the lug 407, or by altering the spring stiffness.

As the gate 230 moves upwardly relative to the valve body 220, the segments 250 and 252 are relieved from the wedging forces which had previously been applied to these segments by the two pairs of parallel wedging-camming surfaces or legs 238, 240, 242 and 244. The segments 250 and 252 can collapse toward the gate, and the seals previously effected between the two segments 250, 252 and the annular seats 10 and 12 are relieved.

At about the time that the sealing forces against the segments 250 and 252 are beginning to be relieved, the rotation of the handle 390 and the nut 326 has proceeded until the leg portion 408B of the bottom torsion spring 408 is brought into contact with the lug 407 carried on the upper stem segment 412 of the stem 232. The upper stem segment 412 is keyed to the main stem 232 by the extension of the protuberant key 414 into a mating cavity in the upper end of the threaded portion 290 of the stem 232. Thus, at the time that the leg portion 408B is rotated with the nut 326, the rotating handle 390 and nut 326 commence to apply torque, through the bottom torsion spring 408 to the stem 232, through the lug 407 on the upper stem segment 412 of the stem 232.

The initial counterclockwise rotational movement of the operator handle 390 causes only upward movement of the stem 232 due to the engagement of the threads on the threaded portion 290 with the threads 328 on the inner surface of the bore 328 through the nut 326. This increment of rotation, however, will be through only a relatively small arc, herein also referred to as the limited free-travel interval of the turning means, and after this the stem 232 and gate 230 undergo rotation essentially in synchronism with the rotation of the handle 390 and the nut 326. This results from the torque applied to the stem 232 through the leg portion 408B of the bottom torsion spring 408 and the lug 407 on the upper stem segment 412 of the stem 232. The limited free-travel interval of the turning means can be adjusted as required for a particular valve application.

Rotation of the handle 390 continues, along with continued rotation of the stem 232, until, after traverse of 90° of stem rotation, a positive stop pin 418 is encountered which prevents further rotation of the stem 232 and of the gate 230. The stop pin 418 projects from the lower side of the bonnet 228 into a cavity 430 in the top of the gate 230 and which is curved through a 90° arc to define, at each of its opposite ends, a gate rotation limit stop. The pin 418 will bear against one of the limit stops when the stem 232 and gate 230 are at the limits of their permissible rotation through the 90° increment of turning between a valve "open" and a valve "closed" position. This 90° turn is completed when the valve 200 has moved from its closed position to its open position in which the bore 234 through the gate 230 is aligned with the upstream fluid flow passageway 222 and the downstream fluid flow passageway 224. After the wedging forces have been relieved from application to the segments 250 and 252, less resistance is offered to the rotation of the gate 230 and the segments 250 and 252 within the valve body 220.

When the stop pin 418 prevents further rotation of the stem 232 and the gate 230, continued turning of the handle 390 past the point where the stop pin 418 has come against the end of the cavity 430 will tighten the bottom torsion spring 408. The increased torque necessary to tighten the bottom torsion spring 408 will be sensed by an operator manually manipulating the handle 390 to know that the valve has moved to its fully open position, and the operator at this point will thus know to cease further turning of the handle 390.

When the valve 200 is to be returned to its closed position, the rotation of the handle 390 is reversed, that is, clockwise looking from top. This will cause the handle 390 and the nut 326 to rotate in the reverse direction, and once the leg 406B of the top torsion spring 406 engages the lug 407, the upper stem segment 412 of the stem 232 and the gate 230 rotate clockwise until, after moving through 90°, further rotational movements of the stem segment 412, the stem 232, the gate 230 and the segments 250 and 252 are arrested. Continued turning of the handle 390 causes the leg portion 408B to move away from the lug 407, relieves torsion from the torsion spring 408, and causes the nut 326 to rotate relative to the stem 14 so as to drive the stem and gate downwardly by reason of the described threaded engagement. That is, in returning to the closed position, before the leg 406B of the top torsion spring 406 engages the lug 407 on the upper stem segment 412 of the stem 232, the stem 232 moves downwards, but not enough to engage the wedging-camming surfaces on the gate segments.

Once the leg 406B engages the lug 407, the stem 232 begins to rotate by transferring force from the nut 326 to the lug 407 through the top torsion spring 406. During the 90° rotation of the stem 232 in order to close the valve 200, the stem 232 does not move downward but rotates concurrently with the nut 326 in the same direction while the top torsion spring 406 continues to engage the lug 407. Once the stop 418 is contacted, further rotation of the nut 326 causes the stem 232 to move downward until such time that the wedging-camming surfaces come into contact thereby camming the segments 250, 252 out into sealing engagement. The leg 406B continues to engage the lug 407 and the extra rotation of the nut 326 beyond the 90° rotation of the gate 230 is absorbed in the top torsion spring 406 which gets wound up in torsion.

The downward movement of the stem 232 causes the gate 230 to wedge the segments 250 and 252 outwardly into valve closing sealing engagement. The continued rotation of the handle 390 and the nut 326 causes the leg portion 406B of the torsion spring 406 to bear against the lug 407. Further rotation will then resiliently load the torsion spring 406 so that an operator grasping the handle 390, will know by the increased torque that the valve 200 is in the closed, sealed position.

It should be noted that for high torques, helical coil springs, belleville springs, or any other springs of high stiffness, can be used instead of the torsion springs 406 and 408. Springs like helical coil springs and belleville springs make it much easier to adjust the limited free-travel interval of the turning means than in the case of where torsion springs are used as illustrated herein.

FIGS. 6 THROUGH 8

Shown in FIG. 6 is an expanding butterfly valve assembly 500 constructed in accordance with the present invention and which incorporates further features thereof. Namely, the expanding butterfly valve 500 comprises a valve body 502 in which is disposed a closure assembly 504. Supported by the valve body 502 is a turning mechanism 506 which is connected to, and serves to operate, the closure assembly 504.

Figure 7:
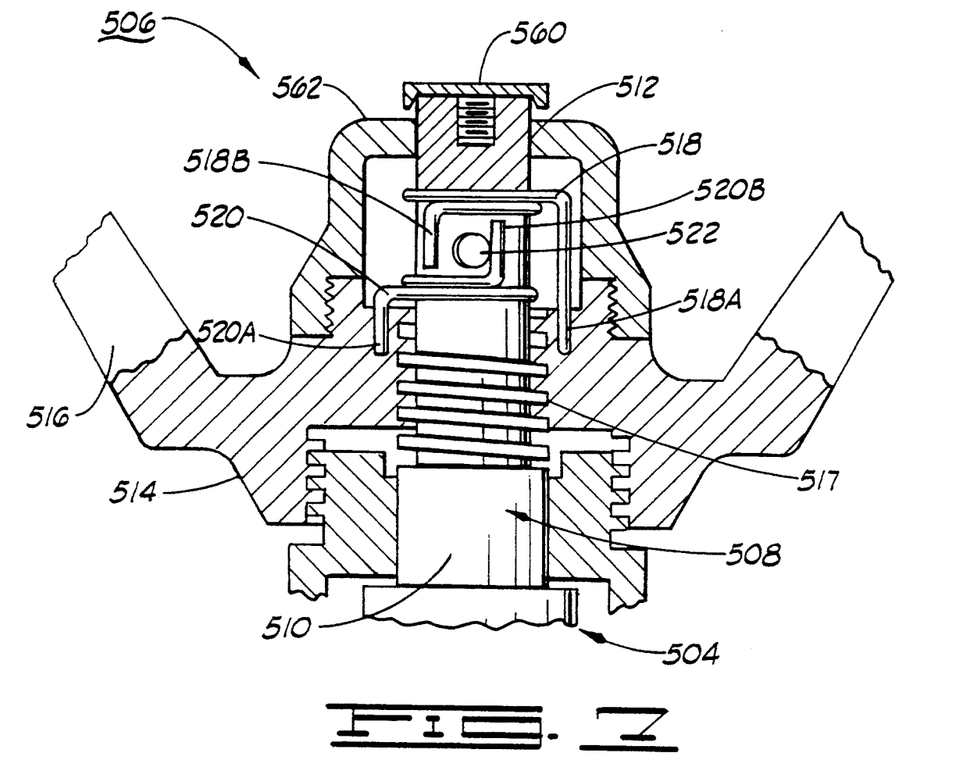
FIG. 7 is an enlarged view of the turning mechanism of FIG. 6.

An enlarged partial view of the closure assembly 504 appears in FIG. 7, and since this is a novel feature of the present invention, the closure assembly 504 will be described first. In FIG. 7, an elongated stem 508 is connected to the closure assembly 504 at one end 510 of the stem 508, and the other end 512 of the stem 508 extends through a hub 514 of a handle 516. The hub 514 is connected to the handle 516 for concurrent movement, and the hub 514 and stem 508 are threadingly connected at 517. Thus, when the handle 516 is rotated, hub 514 is also rotated and the stem 508 is caused to move upwardly or downwardly depending upon the direction of rotation of the handle 516.

A pair of oppositely acting torsion springs 518 and 520 are supported by the hub of the handle and constitute the part of the turn mechanism 506 that serves to impart or couple rotary movement of the handle 516 to the stem 508.

The upper torsion spring 518 has a first end 518A extended into a receiving hole in the hub 514; the first end 518A is then bent through 90° and curved through one or more convolutions encircling the upper end 512 of the stem 508. The other end of the upper torsion spring 518 is then bent 90° and ends in a toe portion 518B which will also be referred to herein as the upper bias contact 518B.

A lug 522 is supported by the stem 508 to protrude into the path of rotation of the upper bias contact 518B when the hub 514 is rotated by the handle 516.

The lower torsion spring 520 has a first end 520A extended into a receiving hole in the hub 514. The first end 520A is located approximately 180° from the first end 518A of the upper torsion spring 518. The first end 520A is bent through 90° and curved through one or more convolutions encircling the upper end 512 of the stem 508, and the other end of the lower torsion spring 520 is bent 90° to form a toe portion 520B, the toe portion 520B also referred to herein as the lower bias contact 520B. The lug 522 protrudes into the path of rotation of the lower bias contact 520B of the lower torsion spring 520 when the hub 514 is rotated by the handle 516. Convolutions of the upper and lower torsion springs 518, 520 around the upper part 512 of the stem 508 extend in opposite directions, and the upper and lower bias contacts 518B and 520B are located on opposite sides of the lug 522 so that the stem 508 can be freely rotated in both directions in the gap therebetween.

When the handle 516 is rotated (for example, counterclockwise looking from the top to open the valve), the hub 514 also is rotated counterclockwise along with the upper and lower torsion springs 518 and 520. The hub supported first ends 518A and 520A of these torsion springs 518, 520 are also rotated counterclockwise thereby. The upper bias contacts 518B moves toward the lug 522, and the lower bias contact 520B moves away from the lug 522 with reference to FIG. 6, which depicts the butterfly valve in closed position.

The stem 508 is free to move up or down until the upper bias contact 518B touches the lug 522. In FIG. 7 as shown, when the handle is rotated counter clockwise, the stem 522 will move upwardly without turning, and the closure member 504 attached to the end 510 of the stem 508 will tend to move off the seating surfaces within the valve body 502 (FIG. 6), thereby relieving the sealing force. The stem 508 will move upwardly without turning because of the threaded connection 517 between the stem 508 and the hub 514.

Once the upper bias contact 518B contacts the lug 522, and the handle 516 is continued to be rotated counter clockwise, the stem 508 will rotate together with the handle 516 as a result of the force transmitted to the stem 508 through the lug 522 by the upper bias contact 518B of the upper torsion spring 518. The stem 508 will rotate until after a traverse of 90°, at which time a positive stop (not shown) is encountered by the closure member 504 which prevents further rotation of the closure member 504. The valve 500 has now been brought into its fully open position, and continued rotation of the handle 516 in the counter clockwise direction will merely cause tightening of the upper torsion spring 518.

When the valve 500 is to be closed, the handle 516 is rotated in the opposite direction (that is, in the clockwise direction looking from the top). This will cause the handle 516, the hub 514 and the upper and lower torsion springs 518 and 520 to rotate together in the clockwise direction. Turning of the handle 516 in the clockwise direction will relieve tension from the upper torsion spring 518 and cause the upper bias contact 518B to move away from the lug 522; the lower bias contact 520B will be moved by this rotation toward the lug 522; and during this time the stem 508 will remain nonrotated.

During this time of nonrotation of the stem 508, the stem 508 is free to move axially while the hub 514 rotates without turning the stem 508. In this case, because of the threaded connection 517 between the hub 514 and the stem 508, the stem 508 will move downwardly until the lower bias contact 520B of the lower torsion spring 520 bears upon the lug 522, and the stem 508 will then rotate together with the handle 516. Continued clockwise rotation of the handle 516 can occur until a traverse of 90° has been traveled, at which time a positive stop (not shown) arrests further rotation of the stem 508 and hence of the closure member 504. Further clockwise rotation of the handle 516 resiliently loads the lower torsion spring 520 while moving the stem 508 downwardly without being rotated. This makes the closure member 504 sealing seat against the seating surfaces of the valve 500 so that the operator of the handle 516 is apprised that the valve 500 is in its closed position.

Returning to FIG. 6, the valve body 502 defines a central cavity 530 which is open to fluid flow passageways extending normal to the drawing page on which FIG. 6 appears. The valve body 502 includes a bonnet 532, and seating surfaces 534A and 534B.

Within the valve body 502 and cavity 530, the closure assembly 504 comprises a rotary gate structure 536 which has a central portion of generally flat and narrow configuration having an upper portion 538 and a lower portion 540. The upper portion 538 of the gate 536 forms inclined, wedging-camming surfaces 542 and 544 located on opposite sides of the gate 536.

The lower portion 540 of the gate 536 forms a pair of inclined wedging-camming surfaces 546 and 548 which are formed on opposite sides of the gate 536 and extend substantially parallel to the wedging-camming surfaces 542 and 544, respectively, disposed on the upper portion 538 of the gate 536. It will be noted that the pairs of parallel wedging-camming surfaces 542, 546 and 544, 548 are relatively widely spaced from each other so as to bear uniform sealing pressure onto the seats 534A, 534B which extend around the central cavity 530 of the valve body 502. And, as for all of the embodiments, the wedging-camming surfaces 542, 544 and 546, 548 form pairs of wedge surfaces which are not coplanar; that is, each such pair comprises wedging-camming surfaces which are substantially parallel spaced apart wedges.

In all of the embodiments of the present invention, for the purpose of the present disclosure the words "wedging-camming surfaces" are used to define either planar or curved wedging surfaces such as rollers that are spaced apart, substantially identically configured surfaces.

Figure 8:
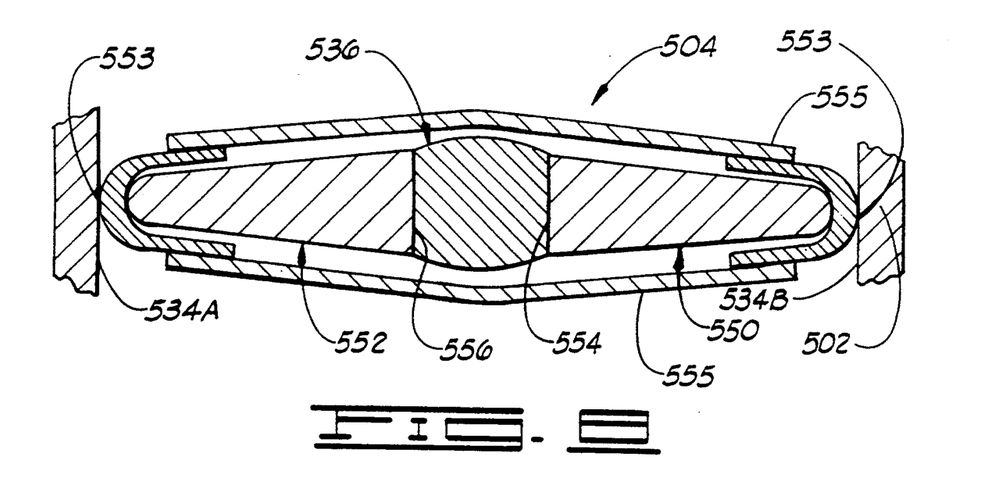
FIG. 8 is a cross sectional view taken at 8—8 in FIG. 6 and shown in partial diagrammatical detail.

On opposite sides of the gate 536 a pair of floating segments 550 and 552 are disposed. As illustrated in FIG. 8, each of the segments 550 and 552 is a tapered but otherwise a substantially flat planar member. For the purpose of this invention, the outer curvature 553 of the floating segments 550 and 552 is selected to sealingly seat against the seats 534A, 534B provided on the valve body 502, and complementary seal plates 555 or an elastomeric sheath, or the like, can be provided as required to maintain the sealing integrity of the closure assembly 504.

The floating segments 550 and 552 have inner gate-contacting sides 554, 556 which correspond in profile configuration to mate with the profile configuration of the gate 536 and are supported in nested relationship therewith as described further hereinbelow.

The segments 550 and 552 will rotate with the gate 536 about an axis 558 which is the longitudinal axis of the gate 536 and which is normal to the fluid flow passageway in the valve 500. Thus, the gate/floating segment arrangement shown in FIG. 6 is constructed for rotation about the central axis 558 so that the gate 536 can be closed to be in sealing engagement with the fluid flow passageway or the gate 536 can be in open configuration. Rotation to such an open configuration moves the floating segments 550 and 552 to a position in which they are located 90° from that shown in FIG. 6. As will be made clear hereinbelow, the gate 536 is free to move reciprocably relative to the segments 550 and 552 in a direction parallel to the axis 558 and transverse to the direction of fluid flow through the valve 500.

The upper portion 538 of the gate 536 extends through an opening in the valve body 502. The end 510 of the stem 508 is connected to the upper end 538 of the gate 536, the stem 508 supported for axial rotation about the axis 558 of the gate 536. The upper end 512 has a threaded bore to which a position indicator 560 is connected. A shield cup 562 is supported by the hub 514. The position indicator 560 shows whether the butterfly valve 500 is in its closed or open position.

It will be appreciated that FIG. 6 is a semi-detailed drawing which does not include the seals and packing normally utilized to provide fluid sealing integrity. The provision of such seals and packing is accomplished by conventional means known to persons of ordinary skill and need not be described further herein for the purpose of the present disclosure. Also, cover plates 555 (FIG. 8) may be needed to prevent leakage of fluid from the joints between the gate 536 and the segments 554, 556. Alternatively, the gate 536 together with segments 554, 556 can be enclosed in a sheath of elastomeric material.

To open valve 500, the handle 516 is rotated and the hub 514 is rotated therewith. This movement causes the lower torsion spring 520, including the lower bias contact 520B, to also rotate. This moves the lower bias contact 520B away from the lug 522. In other words, the hub 514 at this time rotates relative to the threaded portion 517 of the stem 508, and the relative movement is such that the stem 508 and the gate 536 connected thereto are caused to move upwardly relative to the valve body 502.

As the gate 536 moves upwardly relative to the valve body 502, the segments 550 and 552 are relieved from the wedging force previously applied to these segments by the two pairs of parallel wedging-camming surfaces 542, 546 and 544, 548. The segments 550 and 552 can collapse toward the gate 536, and the sealing previously effected between the two segments 550, 552 and the seats 534A and 534B is relieved.

At about the time that the wedging forces against the segments 550 and 552 are relieved, the rotation of the handle 516 and the hub 514 has proceeded until the upper bias contact 518B of the upper torsion spring 518 is brought into contact with the lug 522 carried on the stem 508. At the same time that the upper bias contact 518B contacts the lug 522, the rotating handle 516 and hub 514 commence to apply torque, via the upper torsion spring 518 to the stem 508, through the lug 522.

The initial rotational movement of the operator handle 516 causes only upward movement of the stem 508 due to the engagement of the threaded portion 517. This increment of rotation, however, will be through only a relatively small arc, or limited free travel interval, and after this the stem 508 and the gate 536 under go rotation essentially in synchronism with the rotation of the handle 516 and the hub 514. This results from the force applied to the stem 508 through the upper bias contact 518B of the upper torsion spring 518.

Rotation of the handle 516 continues, along with continued rotation of the stem 508, until, after traverse of 90° of rotation, a positive stop 570 is encountered which prevents further rotation of the stem 508 and of the gate 536. This 90° rotation is completed when the valve 500 has moved from its closed position to its open position in which the butterfly disc assembly comprising the gate 536 and the segments 550, 552 is positioned in a direction parallel to the axis of fluid flow through the valve 500, and fluid will flow on both sides of the butterfly disc assembly. After the sealing forces have been relieved from application to the segments 550 and 552, less resistance is offered to the rotation of the gate 536 and the segments 550 and 552 within the valve body 500.

The stop pin 570 prevents further rotation of the stem 508 and the gate 536 beyond 90°, and continued turning of the handle 516 will tighten the top torsion spring 518. The increased torque necessary to tighten the top torsion spring 518 will be sensed by an operator manually manipulating the handle 516 to know that the valve 500 has been moved to its fully open position, and the operator at this point will thus know to cease further turning of the handle 516.

When the valve 500 is to be returned to its closed position, the rotation of the handle 516 is reversed. This will cause the handle 516 and the hub 514 to rotate in a reverse direction, and once the lower bias contact 520B of the lower torsion spring 520 engages the lug 522, the stem 508 and the gate 536 rotate clockwise until, after moving through 90°, further rotational movement of the stem 508, the gate 536 and the segments 550, 552 is arrested by the stop pin 570. Continued turning of the handle 516 causes the upper bias contact 518B to move away from the lug 522, relieves torsion from the torsion spring 518, and causes the hub 514 to rotate relative to the stem 508 so as to drive the stem 508 and gate 536 downwardly by reason of the threaded connector 517.

That is, in returning to the closed position, before the lower bias contact 520B of the lower torsion spring 520 engages the lug 522 on the stem 508, the stem 508 moves downwardly, but not enough to engage the wedging-camming surfaces on the gate segments 550, 552. Once the lower bias contact 520B engages the lug 522, the stem 508 begins to rotate by transferring force from the hub 514 to the lug 522 through the bottom torsion spring 520. During the 90° rotation of the stem 508 to close the valve 500, the stem 508 does not move downwardly but rotates concurrently with the hub 514 in the same direction while the bottom torsion spring 520 continues to engage the lug 522.

The stop 570 prevents further rotation of the stem 508 and the gate 536 beyond 90°, and further rotation of the hub 514 causes the stem 508 to move downwardly until such time that the wedging-camming surfaces come into contact thereby camming the segments 550, 552 out into sealing engagement. The lower bias contact 520B continues to engage the lug 522 and the extra rotation of the hub 514 beyond the 90° rotation of the gate 536 is absorbed in the bottom torsion spring 520 which gets wound up in torsion.

The continued rotation of the handle 516 and the hub 514 causes the lower bias contact 520B of the bottom torsion spring 520 to bear against the lug 522. Further rotation will then resiliently load the bottom torsion spring 520 so that an operator grasping the handle 516 will know by the increased torque that the valve 500 is in the closed, sealed position. In an offset butterfly disc assembly, the seats 534A and 534B may form an annular seating surface around the fluid flow passageway.

From the above description it is clear that the present invention is well adapted to carry out the objects and to attain the ends and advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A turning mechanism for a rotary valve having a valve body with a fluid flow passageway therethrough, and a closure assembly rotatably disposed in the valve body to selectively open and to close the fluid flow passageway, the turning mechanism comprising:

a stem connected to the closure assembly;

turning means supported by the valve body and rotatable about the stem for selectively rotating the stem;

coupling means interconnecting the turning means and the stem for coupling the turning means and the stem so that free uncoupled rotation of the turning means about the stem occurs during a limited free-travel interval of the turning means thereabout and so that coupled rotational movement of the turning means and the stem occurs following such limited free-travel interval, the turning means comprising a hub rotatably supported by the valve body and wherein the coupling means comprises:

a lug member supported by the stem;

a first bias means supported by the hub for contacting the lug member and imparting rotational movement of the hub to the stem in a selected rotational direction thereof; and a second bias means supported by the hub for contacting the lug member and imparting rotational movement of the hub to the stem in the opposite rotational direction thereof, the first bias means and second bias means disposed to selectively provide no biasing contact with the lug member during the limited free-travel interval of the hub; and connecting means interconnecting the turning means and the stem for imparting selected axial movement to the stem in response to rotational movement of the turning means during the limited free-travel interval of the turning means.

2. The turning mechanism of claim 1 wherein the first bias means comprises a first spring.

3. The turning mechanism of claim 2 wherein the second bias means comprises a second spring.

4. The turning mechanism of claim 3 wherein the first spring is a first torsion spring having a first end, a second end and a middle portion, the first end connected to the hub, the middle portion convoluted around the stem, and the second end forming a first bias contact disposed to selectively contact the lug member during rotational movement of the hub.

5. The turning mechanism of claim 4 wherein the second spring is a second torsion spring having a first end, a second end and a middle portion, the first end connected to the hub, the middle portion convoluted around the stem, and the second end forming a second bias contact disposed to selectively contact the lug member during rotational movement of the hub.

6. The turning mechanism of claim 5 wherein the first bias contact and the second bias contact are spatially disposed on opposite rotational sides of the lug member.

7. The turning mechanism of claim 6 further comprising:

stop means for preventing the rotational movement of the stem beyond a selected arc of rotational travel.

* * * * *